United States Patent
Kikuchi

(10) Patent No.: US 7,139,652 B2
(45) Date of Patent: Nov. 21, 2006

(54) RANGE SELECTION CONTROL DEVICE OF AUTOMATIC TRANSMISSION

(75) Inventor: Masahiko Kikuchi, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 458 days.

(21) Appl. No.: 10/776,267

(22) Filed: Feb. 12, 2004

(65) Prior Publication Data

US 2004/0162661 A1 Aug. 19, 2004

(30) Foreign Application Priority Data

Feb. 18, 2003 (JP) ............................ 2003-039465

(51) Int. Cl.
*G06F 19/00* (2006.01)

(52) U.S. Cl. ..................... 701/51; 701/62; 701/55; 701/56; 74/335; 74/336 R; 74/473.1

(58) Field of Classification Search ............... 701/51, 701/62, 55–56; 475/132; 74/335, 336 R, 74/473.1

See application file for complete search history.

(56) References Cited

U.S. PATENT DOCUMENTS

| | | | |
|---|---|---|---|
| 4,945,484 A | 7/1990 | Cote et al. | |
| 5,409,434 A * | 4/1995 | Furukawa et al. | 477/131 |
| 5,505,674 A * | 4/1996 | Furukawa et al. | 477/130 |
| 5,946,972 A * | 9/1999 | Palmeri | 74/335 |
| 5,989,146 A * | 11/1999 | Brown et al. | 475/207 |
| 6,049,751 A * | 4/2000 | Palmeri | 701/51 |
| 6,056,669 A * | 5/2000 | Marshall | 74/335 |
| 6,139,468 A * | 10/2000 | Goates et al. | 477/97 |
| 6,142,905 A * | 11/2000 | Brown et al. | 475/206 |
| 6,167,979 B1 * | 1/2001 | Taylor et al. | 180/170 |
| 6,205,390 B1 | 3/2001 | Holbrook et al. | |

(Continued)

FOREIGN PATENT DOCUMENTS

EP 1450077 A2 * 8/2004

(Continued)

OTHER PUBLICATIONS

D. Hobeiin et al., Progress in automotive position sensors and introduction of the Hellainductive position sensor, Vehicle Sensors, Actuators, and Diagnostics, SAE 2004 World Congress, Mar. 8, 2004 (from Dialog(R) File 95, acc. No. 01862563).*

(Continued)

*Primary Examiner*—Cuong Nguyen
(74) *Attorney, Agent, or Firm*—Foley & Lardner LLP

(57) ABSTRACT

A range selector issues a range selection command signal representative of an operation range of a shift-by-wire type automatic transmission meeting with a driver's intention. The operating range is at least one of P(parking)-range, R(reverse)-range, N(neutral)-range and D(drive)-range. An actuator causes the transmission to assume a certain operation range when receiving an instruction signal. A control unit issues the instruction signal by processing the range selection command signal, so that the transmission is able to assume an operation range that meets with the driver's intention. The control unit is configured to carry out, when the range selector fails to issue the range selection command signal, presuming a range selection intended by the driver based on a previous operation of the range selector; and based on the presumption, causing through the actuator the transmission to actually carry out at least one of first and second range selection operations. The first range selection operation meets with the driver's intention and the second range selection operation is to maintain the operation range that has been kept just before the failure of the range selector.

7 Claims, 4 Drawing Sheets

U.S. PATENT DOCUMENTS

| | | | |
|---|---|---|---|
| 6,238,317 B1 * | 5/2001 | Brown et al. | 475/206 |
| 6,553,306 B1 * | 4/2003 | Sayman | 701/110 |
| 6,589,131 B1 * | 7/2003 | Miyata et al. | 477/34 |
| 6,658,952 B1 * | 12/2003 | Hayashi et al. | 74/336 R |
| 6,659,900 B1 * | 12/2003 | Nagasaka et al. | 475/132 |
| 6,736,754 B1 * | 5/2004 | Davids et al. | 477/92 |
| 6,835,162 B1 * | 12/2004 | Yamauchi et al. | 477/101 |
| 6,845,683 B1 * | 1/2005 | Tarui et al. | 74/335 |
| 6,866,611 B1 * | 3/2005 | Tsuzuki et al. | 477/97 |
| 6,877,390 B1 * | 4/2005 | Tsuzuki et al. | 74/335 |
| 6,880,419 B1 * | 4/2005 | Berger et al. | 74/335 |
| 6,889,812 B1 * | 5/2005 | Wendeberg et al. | 192/219.4 |
| 6,948,582 B1 * | 9/2005 | Shiomi et al. | 180/315 |
| 6,983,668 B1 * | 1/2006 | Powell et al. | 74/335 |
| 6,984,161 B1 * | 1/2006 | Suzuki et al. | 451/5 |
| 6,996,465 B1 * | 2/2006 | Kim | 701/51 |
| 2002/0115527 A1 * | 8/2002 | Miyata et al. | 477/34 |
| 2004/0162661 A1 * | 8/2004 | Kikuchi | 701/62 |
| 2004/0186646 A1 * | 9/2004 | Kuwata et al. | 701/55 |
| 2004/0249541 A1 * | 12/2004 | Kim | 701/51 |

FOREIGN PATENT DOCUMENTS

| | | |
|---|---|---|
| GB | 2 307 522 A | 5/1997 |
| JP | 03-157568 A | 7/1991 |
| JP | 03-229062 A | 10/1991 |
| JP | 5-203042 A | 8/1993 |
| JP | 2003-123899 * | 4/2003 |
| JP | 3716837 B2 * | 11/2005 |

OTHER PUBLICATIONS

Mike Brezonick, Shift-By-Wire System For Allison Transmissions, , Diesel & Gas Turbine Publications, COPYRIGHT 2001.*

* cited by examiner

RANGE SELECTION CONTROL DEVICE OF AUTOMATIC TRANSMISSION

BACKGROUND OF THE INVENTION

1. Field of the Invention

The present invention relates in general to automotive automatic transmissions of a so-called shift-by-wire type wherein a range change of the transmission is carried out by an actuator that is controlled in accordance with a range selection command signal issued from a range selector manually actuated by a driver, and the more particularly to a range selection control device that carries out the above-mentioned automatic range change of the transmission. More specifically, the present invention relates to the range selection control devices of a type that can cope with such a difficult case wherein the range selector fails to issue the command signal.

2. Description of the Related Art

In automatic transmissions having a continuously variable transmission unit installed therein, there is arranged a link mechanism between a shift lever that is manipulated by a driver and a manual valve that is installed in a hydraulic control circuit of the transmission. That is, when, upon need of a speed change, the driver shifts the shift lever to a desired range, the manual valve is shifted to a position to induce a desired operation range of the transmission that corresponds to the range desired by the driver.

In the field of the automatic transmissions, a so-called shift-by-wire type has been proposed and put into practical use for allowing the transmission to exhibit a much improved performance. That is, in the shift-by-wire type transmissions, the range section is electronically carried out.

One of the automatic transmissions of such shift-by-wire type is shown in Japanese Laid-open Patent Application (Tokkaihei) 5-203042, which comprises a range selection switch (or range selector) that issues a corresponding range selection command signal when a driver shifts the shift lever to P(parking)-range, R(reverse)-range, N(neutral)-range, or D(drive)-range, and an electric motor (or actuator) that moves the manual valve to a corresponding position upon receiving the range selection command signal from the range selection switch.

SUMMARY OF THE INVENTION

However, due to its inherent construction, the transmission of the above-mentioned Japanese Patent Application tends to fail to exhibit a satisfied operation particularly when, by a driver with an intention of shifting the shift lever from D-range to N-range, the shift lever is moved awkwardly to an incomplete intermediate position between D-range and N-range. In this case, the range selection switch issues no signal and the transmission is forced to keep the manual valve at a position corresponding to D-range. However, under this condition, there is induced an undesired circumstance wherein the transmission assumes D-range although the driver would think that the shift lever has been placed at N-range. Of course, if, under this condition, an accelerator is depressed, the vehicle is accelerated contrary to the driver's intention.

Accordingly, an object of the present invention is to provide a range selection control device of an automatic transmission, which is free of the above-mentioned drawing.

According to a first aspect of the present invention, there is provided a range selection control device of a shift-by-wire type automatic transmission of a motor vehicle, which comprises a range selector that issues a range selection command signal representative of an operation range of the transmission meeting with a driver's intention, the operating range being at least one of P(parking)-range, R(reverse)-range, N(neutral)-range and D(drive)-range; an actuator that causes the transmission to assume a certain operation range when receiving an instruction signal; and a control unit that issues the instruction signal by processing the range selection command signal, so that the transmission is able to assume an operation range that meets with the driver's intention, wherein the control unit is configured to carry out, when the range selector fails to issue the range selection command signal, presuming a range selection intended by the driver based on a previous operation of the range selector; and based on the presumption, causing through the actuator the transmission to actually carry out at least one of first and second range selection operations, the first range selection operation meeting with the driver's intention and the second range selection operation being to maintain the operation range that has been kept just before the failure of the range selector.

According to a second aspect of the present invention, there is provided, in a range selection control device of a shift-by-wire type automatic transmission of a motor vehicle having a range selector that issues a range selection command signal representative of an operation range of the transmission meeting with a driver's intention, the operating range being at least one of P(parking)-range, R(reverse)-range, N(neutral)-range and D(drive)-range, and actuator that causes the transmission to assume a certain operation range when receiving an instruction signal, the instruction signal being produced by processing the range selection command signal, so that the transmission is able to assume an operation range that meets with the driver's intention, a method of operating the range selection control device which comprises, when the range selector fails to issue the range selection command signal, presuming a range selection intended by the driver based on a previous operation of the range selector; and based on the presumption, causing through the actuator the transmission to actually carry out at least one of first and second range selection operations, the first range selection being meeting with the driver's intention and the second range selection operation being to maintain the operation range that has been kept just before the failure of the range selector.

DETAILED DESCRIPTION OF THE INVENTION

Figure 1:
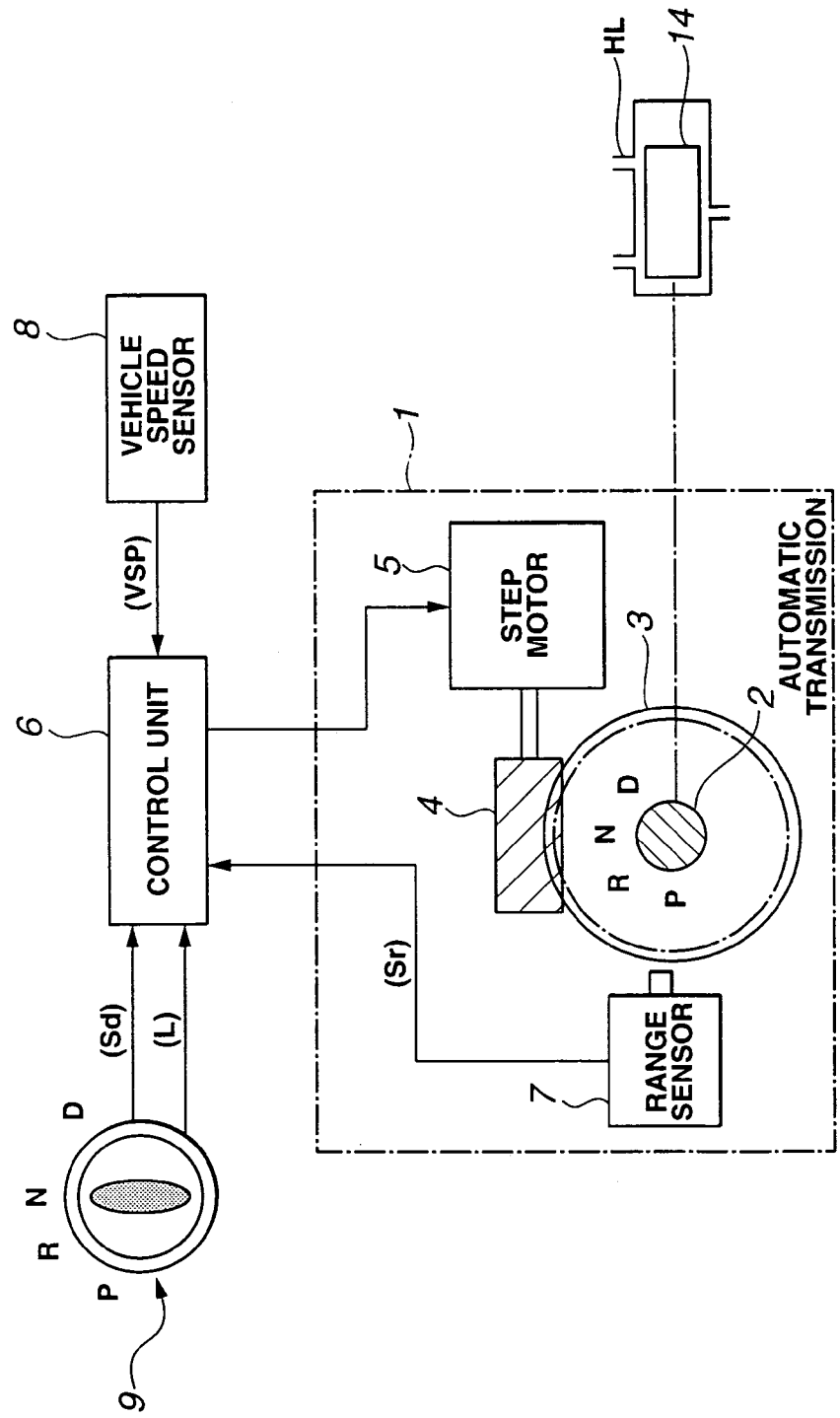
FIG. 1 is a block diagram showing a range selection control device of an automatic transmission of a shift-by-wire type, which is an embodiment of the present invention.

Referring to FIG. 1 of the drawings, there is diagrammatically shown a range selection control device of an automatic transmission, which is an embodiment of the present invention. The automatic transmission is of a shift-by-wire type.

In the drawing, the transmission is indicated by reference numeral 1, which has a continuously variable transmission unit installed therein. Indicated by numeral 2 is a manual shaft which rotates about its axis when a shift lever (not shown) is moved. That is, when, due to movement of the shift lever, manual shaft 2 is rotated to P-range, R-range, N-range or D-range, a manual valve 14 linked to manual shaft 2 is shifted to a corresponding position for establishing a requested speed condition of the transmission 1.

Tightly disposed on manual shaft 2 is a worm wheel 3 with which a worm gear 4 is meshed, as shown. Worm gear 4 is driven by a step motor 5 which serves as an actuator. Thus, upon energization of step motor 5, the same rotates manual shaft 2 through worm gear 4 and worm wheel 3. With the rotation of manual shaft 2, manual valve 14 operatively installed in a hydraulic line HL is moved to a desired position corresponding to P-range, R-range, N-range or D-range. As is shown in the drawing, the four ranges (or positions), viz., P-, R-, N- and D-ranges relative to manual shaft 2 are arranged in the illustrated order, that is, R-range is located between P-range and N-range, and N-range is located between R-range to D-range.

Step motor 5 is controlled by a control unit 6. For this control, various information signals are fed to control unit 6, which are a selected range signal "Sr" issued from a range sensor 7 that detects a selected range of the transmission 1 from an angular position of manual shaft 2, a vehicle speed signal "VSP" issued from a vehicle speed sensor 8 that detects a vehicle speed of the associated vehicle, and a range command signal "sd" and a distance signal "L" that are issued from a range selection switch 9.

Control unit 6 is a microcomputer which generally comprises CPU (central processing unit), RAM (random access memory), ROM (read only memory), and Input and Output Interfaces.

Range selection switch 9 is a range selector that issues a range selection command signal representative of an operation range of the transmission 1 that is really needed by the driver. Range selection switch 9 is operated in accordance with movement of a shift lever (not shown) of the transmission 1. If desired, range selection switch 9 may be of a type that is directly handed by the driver.

Figure 3A:
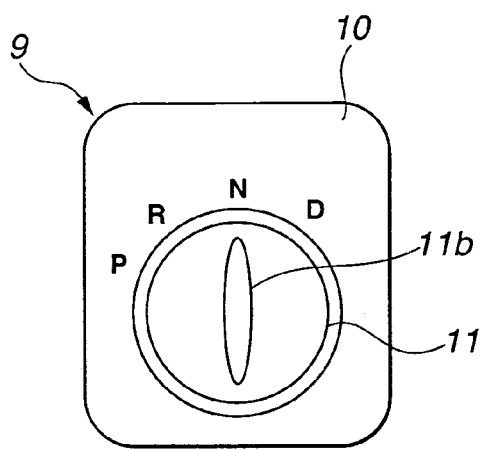
FIGS. 3A and 3B are front and side views of a range selection switch employed in the invention.
Figure 3B:
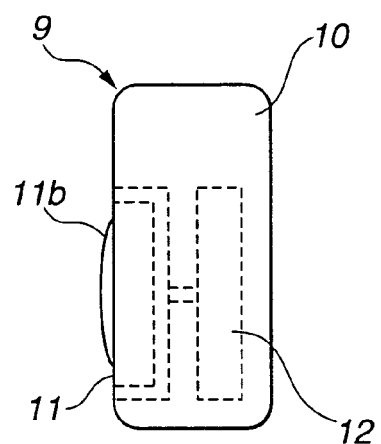

As is shown in FIGS. 3A and 3B, range selection switch 9 comprises a housing 10, a selector dial 11 that is rotatably installed in housing 10 and a shift switch 12 that is installed in housing 10. Selector dial 11 has a knob 11b provided thereon. The knob 11b may be removed when range selection switch 9 is of a type that is tuned in accordance with the movement of the shift lever of the transmission 1.

Figure 4A:
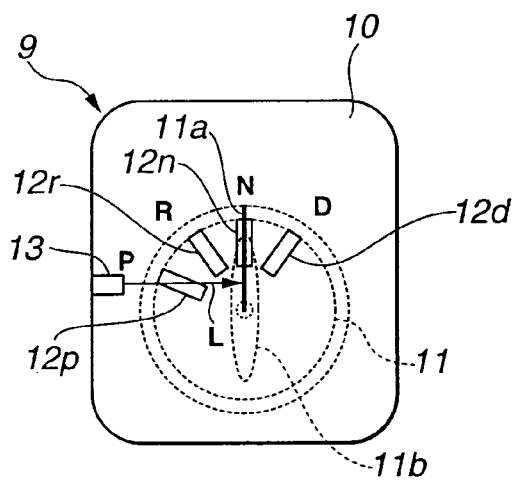
FIGS. 4A and 4B are views similar to FIGS. 3A and 3B, but showing an internal constitution of the range selection switch.
Figure 4B:
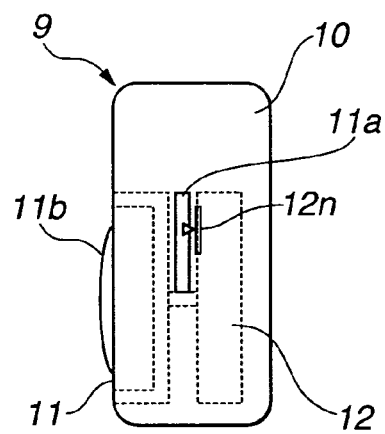

As is seen from FIGS. 4A and 4B, particularly FIG. 4B, that show the interior of the range selection switch 9, a point plate 11a is fixed to selector dial 11 to rotate therewith, and four terminal plates 12p, 12r, 12n and 12d are fixed to shift switch 12 on a circular path on and along which the point plate 11a travels when selector dial 11 is turned. Thus, when, due to movement of the shift lever of the transmission 1, selector dial 11 is turned, point plate 11a is also turned while slidably contacting the terminal plates 12p, 12r, 12n and 12d one after another or 12d, 12n, 12r and 12p.

As is seen from FIG. 4A, these terminal plates 12p, 12r, 12n and 12d are arranged in order of the arrangement of the P-, R-, N- and D-ranges.

As is seen from FIG. 4A, an optical distance sensor 13 is fixed to an inner wall of housing 10 to detect a distance "L" to point plate 11a therefrom. As will be seen from the drawing, the distance "L" changes in accordance with rotation of selector dial 11.

When, upon shifting of the shift lever to a certain position, selector dial 11 takes a certain angular position with point plate 11a in contact with one of terminal plates 12p, 12r, 12n and 12d, range selection switch 9 issues to control unit 6 a range command signal "sd" that represents a needed operation range of the transmission 1 denoted by the mark "P", "R", "N" or "D". That is, when the driver turns selector dial 11 to the position of mark "N", range selection switch 9 issues a range command signal "sd" that represents N-range of the transmission 1 that is really needed by the driver.

Distance signal "L" detected by optical distance sensor 13 is also fed to control unit 6.

Figure 2:
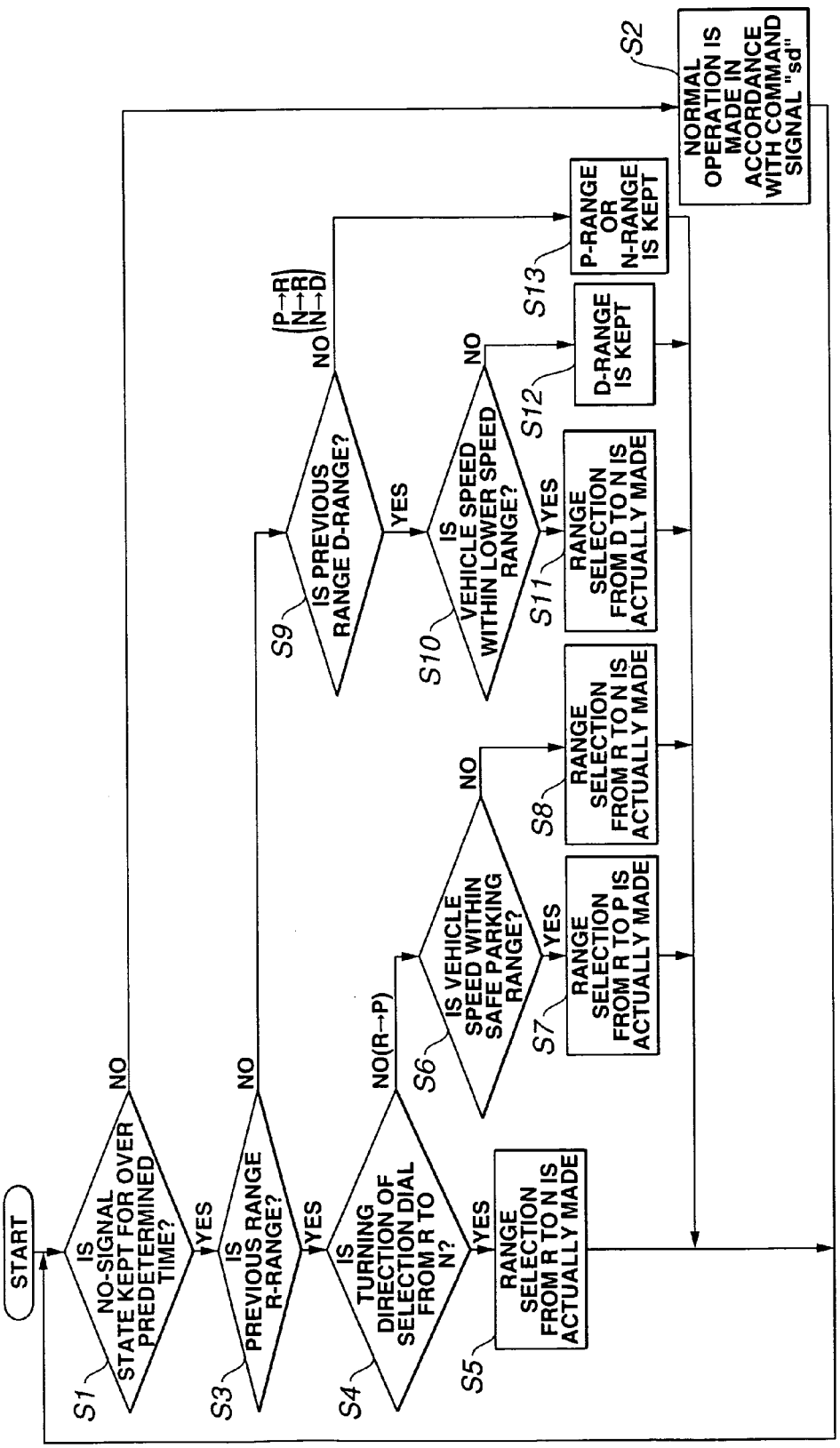
FIG. 2 is a flowchart showing operation steps executed by a control unit employed in the present invention.

Referring to FIG. 2, there is shown a flowchart that show programmed operation steps executed 6 by control unit 6 for carrying out a range selection of the transmission 1.

At step S1, judgment is carried out as to whether a silence time for which range selection switch 9 is suspended from issuing the range command signal "sd" has become longer than a predetermined time or not.

In the following, the silence time of the range selection switch 9 will be described.

When, as is seen from FIGS. 4A and 4B, selector dial 11 is turned by a driver to a certain angular position where point plate 11a is in contact with one of the four terminal plates 12p, 12r, 12n and 12d, range selection switch 9 issues a range command signal "sd" that represents an operation range of the transmission 1 which is really needed by the driver. That is, as has been mentioned hereinabove, when the driver turns selector dial 11 to position of the mark "D", range selection switch 9 issues a range command signal "sd" that is needed for establishing D-range operation of the transmission 1.

Figure 5A:
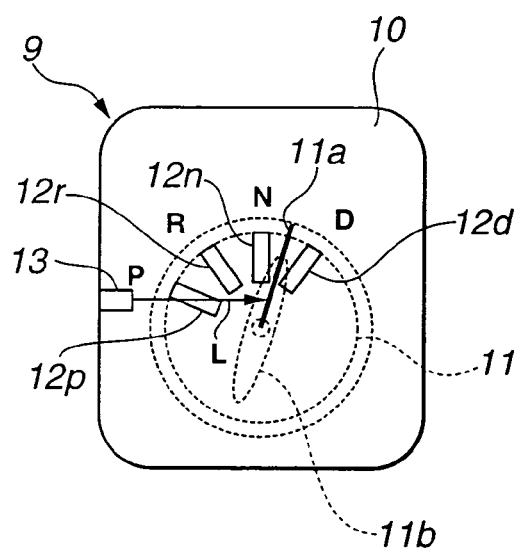
FIGS. 5A and 5B are views similar to FIGS. 4A and 4B, but showing a condition wherein the range selection switch issues no signal.
Figure 5B:
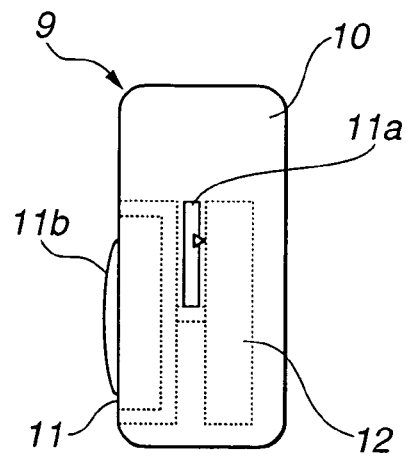

While, when, as is seen from FIGS. 5A and 5B, due to manipulation error to selector dial 11, the same happens to stop at an awkward or incomplete position between two complete positions, for example, a position between the mark "N" and the mark "D", point plate 11a fails to contact any of the terminal plates 12n and 12d. Under this condition, range selection switch 9 is suspended from issuing a range command signal "sd".

Thus, while the selector dial 11 is in such incomplete position, a so-called no-signal state is kept by range selection switch 9. While, when selector dial 11 is being manipulated or under rotation, such no-signal state is not kept for a long time because point plate 11a contacts the terminal plates 12p, 12r, 12n and 12d one after another.

It is to be noted that such no-signal state is also induced when range selection switch 9 fails to operate.

Thus, step S1 of the flowchart of FIG. 2 is a step for judging whether or not selector dial 11 has been erroneously manipulated, or range selection switch 9 has failed to operate.

Referring back to FIG. 2, if NO at step S1, that is, when it is judged that selector dial 11 is in the complete position or range selection switch 9 is in a normal condition, the operation flow goes to step S2. At this step S2, based on a range-command signal "sd" issued from range selection switch 9, step motor 5 (see FIG. 1) is turned to a position that corresponds to the range represented by the signal "sd". With the turning of step motor 5, manual shaft 2 is turned moving manual valve 14 to a corresponding position thereby to establish a requested speed condition of the transmission 1.

While, if YES at step S1, that is, when it is judged that selector dial 11 is in the incomplete position or range selection switch 9 fails to operate normally, the operation flow goes to step S3. At this step S3, based on a previous value of the selected range signal "Sr" that has been detected by range sensor 7 (see FIG. 1), judgment is carried out as to whether a previously selected range that has been taken just before the no-signal state was R-range or not.

If YES, that is, when it is judged that the previous range was R-range, the operation flow goes to step S4. At this step S4, with reference to a variation of a present distance "L" relative to a previous distance "L" which are derived from the distance signal "L" issued from distance sensor 13, judgment is carried out as to whether the direction in which selector dial 11 was turned just before the no-signal state was a direction from the mark "R" to the mark "N" or a direction from the mark "R" to the mark "P".

If YES, that is, when it is judged that the direction was from the mark "R" to mark "N", the operation flow goes to step S5. At this step S5, a range selection from R-range to N-range is actually carried out meeting with the driver's intention.

As is seen from the above, when range selection switch 9 does not issue a range command signal "sd" for over a predetermined time, the R-range is not maintained, but a range selection is actually carried out from R-range to N-range meeting the driver's intention. Thus, under this condition, if the driver depresses the accelerator pedal, backward movement of the vehicle, which is contrary to the driver's intention, is not carried out.

If NO at step S4, that is, when it is judged that the direction was from the mark "R" to mark "P", the operation flow goes to step S6. At this step S6, judgment is carried out as to whether or not the vehicle speed is within a safe parking speed range that permits a safe parking lock. It is to be noted that when the vehicle speed is over such range, the action of a parking device for bringing a parking pawl into engagement with a parking gear would induce a breakage of the parts or at least a gear noise produced therefrom.

If YES, that is, when it is judged that the vehicle speed is within the safe parking speed range, the operation flow goes to step S7, and there, a range selection from R-range to P-range is actually carried out meeting with the driver's intention. While, if NO, that is, when it is judged that the vehicle is over the safe parking speed range, the operation flow goes to step S8, and there, a range selection from R-range to N-range is carried out for avoiding the breakage or gear noise of the parking device.

As will be seen from the above, also in the case wherein the vehicle speed is within the safe parking speed range or over the safe parking speed range, the range selection from R-range to P-range or from R-range to N-range is carried out without maintaining R-range that has been assumed at a time just before the no-signal state. That is, also in such case, a range selection for the purpose of stopping the vehicle is actually carried out meeting with the driver's intention. That is, under this condition, even when the driver depresses the accelerator pedal, undesired backward movement of the vehicle never occurs.

It is to be noted that when the vehicle speed is within the safe parking speed range, the actual range selection is made toward N-range not toward P-range. Thus, breakage of the parking device is prevented. That is, when the vehicle speed is lowered to the safe parking safe range, the range selection from R-range to P-range is actually carried out, which fully reflects the driver's intention. Thus, if the vehicle is subjected to a no-signal state of range selection switch 9 on a sloped road, the P-range is assuredly obtained.

Referring back to the flowchart of FIG. 2, if NO at step S3, that is, judgment is so made that the previously selected range was not R-range, the operation flow goes to step S9. At this step S9, judgment is carried out as to whether the previously selected range that has been taken just before the no-signal state was D-range or not (viz., either one of P-range and N-range).

If YES at step S9, that is, when it is judged that the previously selected range was D-range, the operation flow goes to step S10. At this step S10, judgment is carried out as to whether the vehicle speed is within a lower speed range that needs no engine braking or not (viz., a higher speed range that needs the engine braking).

If YES at step S10, that is, when the vehicle speed is within the lower speed range, the operation flow goes to step S11. At this step S11, a range selection from D-range to N-range is actually carried out meeting with the driver's intention.

In view of the arrangement of the marks "P", "R", "N" and "D" of the range selection switch 9, when the no-signal state of range selection switch 9 occurs just after the condition of D-range, it is easily expected that the range selection switch 9 has been handled by the driver for the purpose of shifting the range from D-range to N-range.

As will be seen from the above, in the case wherein the vehicle speed is within the lower speed range, the range selection is made from D-range to N-range meeting with the driver's intention. Accordingly, in this case, if the driver depresses the accelerator pedal, forward movement of the vehicle, which is contrary to the driver's intention, is not carried out.

If NO at step S10, that is, when the vehicle speed is over the lower speed range that needs an engine brake, the operation flow goes to step S12 to keep D-range.

It is to be noted that keeping D-range brings about an engine brake and thus speed reduction of the vehicle is easily and quickly achieved. When, due to this speed reduction, the vehicle speed becomes into the lower speed range, step S10 issues YES and thus the range selection from D-range to N-range is actually carried out at step S11 meeting with the driver's intention.

If NO at step S9, that is, when it is judged that the previously selected range was not D-range, that is, the range was P-range or N-range, the operation flow goes to step S13 to keep P-range or N-range.

In view of the arrangement of the marks "P", "R", "N" and "D" of the range selection switch 9, when the no-signal state of range selection switch 9 occurs just after the condition of P-range or N-range, it is easily expected that the range selection switch 9 has been handled by the driver for the purpose of shifting the range from P-range to R-range, from N-range to R-range or from N-range to D-range. Thus, at step S13, P-range or N-range is maintained. Under this condition, the vehicle is not moved forward even if the driver depresses the accelerator pedal.

As is described hereinabove, for sensing the driver's shift intention, range selection switch 9 is equipped with shift switch 12 for judging the range intended by the driver and distance sensor 13 for judging the operation direction intended by him or her. However, the present invention is not limited to such devices 12 and 13. That is, for effecting such judgments, potentiometers may be used in the present invention.

The entire contents of Japanese Patent Application 2003-039465 filed Feb. 18, 2003 are incorporated by reference.

Although the invention has been described above with reference to the embodiment of the invention, the invention is not limited to such embodiment as described above. Various modifications and variations of such embodiment may be carried out by those skilled in the art, in light of the above description.

What is claimed is:

1. A range selection control device of a shift-by-wire type automatic transmission of a motor vehicle, comprising:
   a range selector that issues a range selection command signal representative of an operation range of the transmission meeting with a driver's intention, the operating range being at least one of P(parking)-range, R(reverse)-range, N(neutral)-range and D(drive)-range;
   an actuator that causes the transmission to assume a certain operation range when receiving an instruction signal; and
   a control unit that issues the instruction signal by processing the range selection command signal, so that the transmission is able to assume an operation range that meets with the driver's intention,
   wherein the control unit is configured to carry out:
   when the range selector fails to issue the range selection command signal, presuming a range selection intended by the driver based on a previous operation of the range selector; and
   based on the presumption, causing through the actuator the transmission to actually carry out at least one of first and second range selection operations, the first range selection operation meeting with the driver's intention and the second range selection operation being to maintain the operation range that has been kept just before the failure of the range selector.

2. A range selection control device as claimed in claim 1, in which the control unit is further configured to presume the driver's intended range selection based on both the operation range that has been kept just before the failure of the range selector and a direction in which the range selector has been moved just before the range selector failure.

3. A range selection control device as claimed in claim 1, in which the control unit is further configured to carry out:
   upon presuming that the range selection intended by the driver would be a range switch from one of P-range and N-range to D-range with the range selector being in failure, maintaining one of P-range and N-range.

4. A range selection control device as claimed in claim 1, in which the control unit is further configured to carry out:
   upon presuming that the range selection intended by the driver would be a range change from D-range to one of P-range and N-range with the range selector being in failure, effecting actually the range change to one of P-range and N-range.

5. A range selection control device as claimed in claim 4, in which the control unit is further configured to carry out:
   upon presuming that the range selection intended by the driver would be a range change from D-range to P-range with the range selector being in failure, determining whether or not a speed of the vehicle is within a safe parking speed range that permits a safe parking lock of the transmission;
   effecting actually the range change to P-range when the vehicle speed is determined within the safe parking speed range; and
   effecting actually the range change to N-range when the vehicle speed is over the safe parking speed range.

6. A range selection control device as claimed in claim 4, in which the control unit is further configured to carry out:
   upon presuming that the range selection intended by the driver would be a range change from D-range to N-range with the range selector being in failure, determining whether or not a speed of the vehicle is within a lower speed range that needs no engine braking,
   effecting actually the range change to N-range when the vehicle speed is determined within the lower speed range; and
   maintaining D-range when the vehicle speed is determined higher than the lower speed range.

7. In a range selection control device of a shift-by-wire type automatic transmission of a motor vehicle having a range selector that issues a range selection command signal representative of an operation range of the transmission meeting with a driver's intention, the operating range being at least one of P(parking)-range, R(reverse)-range, N(neutral)-range and D(drive)-range, and actuator that causes the transmission to assume a certain operation range when receiving an instruction signal, the instruction signal being produced by processing the range selection command signal, so that the transmission is able to assume an operation range that meets with the driver's intention,
   a method of operating the range selection control device comprising:
   when the range selector fails to issue the range selection command signal, presuming a range selection intended by the driver based on a previous operation of the range selector; and
   based on the presumption, causing through the actuator the transmission to actually carry out at least one of first and second range selection operations, the first range selection being meeting with the driver's intention and the second range selection operation being to maintain the operation range that has been kept just before the failure of the range selector.

* * * * *